United States Patent
Corwin

(10) Patent No.: US 10,317,663 B2
(45) Date of Patent: Jun. 11, 2019

(54) DETERMINATION OF DEFLECTION OF A MICROSCOPE SLIDE

(71) Applicant: General Electric Company, Schenectady, NY (US)

(72) Inventor: Alex David Corwin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 645 days.

(21) Appl. No.: 14/634,465

(22) Filed: Feb. 27, 2015

(65) Prior Publication Data
US 2016/0252713 A1   Sep. 1, 2016

(51) Int. Cl.
| | | |
|---|---|---|
| *H04N 7/18* | (2006.01) | |
| *G02B 21/36* | (2006.01) | |
| *G02B 7/38* | (2006.01) | |
| *G02B 21/24* | (2006.01) | |

(52) U.S. Cl.
CPC .............. *G02B 21/365* (2013.01); *G02B 7/38* (2013.01); *G02B 21/244* (2013.01)

(58) Field of Classification Search
CPC ....... G02B 21/365; G02B 21/244; G02B 7/38
USPC .......................................................... 348/80
See application file for complete search history.

(56) References Cited

U.S. PATENT DOCUMENTS

| | | |
|---|---|---|
| 5,257,091 A | 10/1993 | Caicedo, Jr. et al. |
| 5,790,710 A | 8/1998 | Price |
| 7,312,919 B2 | 12/2007 | Overbeck |
| 7,646,495 B2 | 1/2010 | Olsen et al. |
| 8,013,313 B2 | 9/2011 | Erlbacher et al. |
| 8,071,929 B2 | 12/2011 | Sato et al. |
| 8,797,396 B2 | 8/2014 | Dietz et al. |
| 2005/0157385 A1* | 7/2005 | Heffelfinger ........... G02B 21/16 359/385 |
| 2012/0194729 A1* | 8/2012 | Zahniser .............. G02B 21/244 348/345 |
| 2015/0330776 A1* | 11/2015 | Hayashi ................. G02B 21/26 356/138 |
| 2016/0069808 A1* | 3/2016 | Bouzid .............. G01B 11/0608 250/459.1 |

FOREIGN PATENT DOCUMENTS

| | | |
|---|---|---|
| GB | 2122045 A | 1/1984 |
| JP | H08115873 A | 5/1996 |

* cited by examiner

*Primary Examiner* — Richard T Torrente
(74) *Attorney, Agent, or Firm* — Eversheds Sutherland (US) LLP

(57) ABSTRACT

The present approach relates to the measure of the planar tilt of a slide on a microscope using an integrated auto-focuser. The tilt of the slide can be used to detect improperly loaded slides (i.e. if the slide is resting on either the cover-slip or a printed barcode), compensate for misalignment between the microscope optical axis and the slide, and reduce subsequent focusing times.

9 Claims, 11 Drawing Sheets

DETERMINATION OF DEFLECTION OF A MICROSCOPE SLIDE

BACKGROUND

The subject matter disclosed herein relates to acquisition of microscopy images, such as of biological or histological samples. More particularly, the disclosed subject matter relates to the calibration and focus of microscopes used in such image acquisition protocols.

Certain types of molecular pathology examinations utilize a multiplexing workflow for molecular pathology imaging. When generating images using such a multiplexing workflow, a single slice of tissue (i.e., a single sample) may be used. The multiplexing workflow allows images of the tissue sample acquired over multiple rounds of imaging to be layered, with each round of imaging being directed to a different set of biomarkers applied to the sample. Through the combination of biomarkers acquired over multiple rounds of imaging, a comprehensive view of tissue composition may be attained for the sample.

By way of example, in one such approach the tissue sample is repeatedly stained and bleached during a given imaging protocol. A round of image acquisition may be performed using an automated fluorescence microscope for background acquisition or after each stain or bleach cycle. For example, after an initial stain application a set of images may be acquired, after which the sample may be bleached and stained with the next biomarker and another set of images acquired.

With this in mind, one problem arising from microscopy imaging in general, including multiplexed approaches such as the one described, is how to calibrate (e.g., optically, geometrically, mechanically, and so forth) certain aspects of an image acquisition by a microscope. For example, if a tissue slide is not loaded properly into a slide holder, there is a risk of tilted slide loading and possible out-of-focus images during an automated image acquisition. In particular, when a slide is loaded into a slide holder tilted and the tilt has exceeded the focusing range of the objective for imaging, all or part of some images may be out of focus.

Prior attempts are characterizing the planar tilt of a slide have depended on utilizing image-based focus at a number of points to determine a base focus height, and then calculate a tilt from this. However, this approach only works for locations on the slide where tissue exists, and is therefore an incomplete solution. Approaches are needed that are more versatile, that are more accurate or as accurate, and which are both faster and less computationally intensive.

BRIEF DESCRIPTION

In one embodiment, a computer-implemented method for assessing tilt of a slide is provided. In accordance with this method, a plurality of autofocus measurements is acquired at fixed locations on a slide and along a first dimension generally perpendicular to a slide holder on which the slide is positioned. The different fixed locations are independent of the presence or absence of a tissue sample at the fixed locations. A surface is fit to the plurality of autofocus measurements. Based on the fit of the surface to the plurality of autofocus measurements, a measure of the tilt of the slide relative to the slide holder is derived.

In a further embodiment, a computer-implemented method for imaging a slide is provided. In accordance with this method, a measured tilt of a slide positioned on a slide holder of a microscope is generated or received. A microscope objective is automatically focused using the measured tilt to establish an initial focus position for a first location on the slide. One or more automatically focused images are acquired of the slide at different locations on the slide using the microscope objective. The microscope objective is automatically focused at each location to account for at least the measured tilt.

In an additional embodiment, a digital microscopy imaging system is provided. The digital microscopy imaging system comprises: a stage configured to hold a slide; an objective and image sensor configured to acquire images of a portion of the slide, when present; a position controller configured to move one or both of the objective and the stage relative to one another in accordance with an imaging protocol; a controller configured to control operation of one or both of the position controller and the image sensor; and a laser autofocuser configured to emit a ranging beam toward the stage. In addition, the digital microscopy imaging system comprises a memory storing one or more routines; and a processing component configured to execute the one or more routines stored in the memory. The one or more routines, when executed by the processing component, cause acts to be performed comprising: acquiring a plurality of autofocus measurements using the laser autofocuser, wherein autofocus measurements are acquired at different fixed locations relative to the slide, when present, and wherein the fixed locations are independent of the presence or absence of a tissue sample at the fixed locations; fitting a surface to the plurality of autofocus measurements; and, based on the fit of the surface to the plurality of autofocus measurements, deriving a measure of the tilt of the slide relative to the slide holder.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
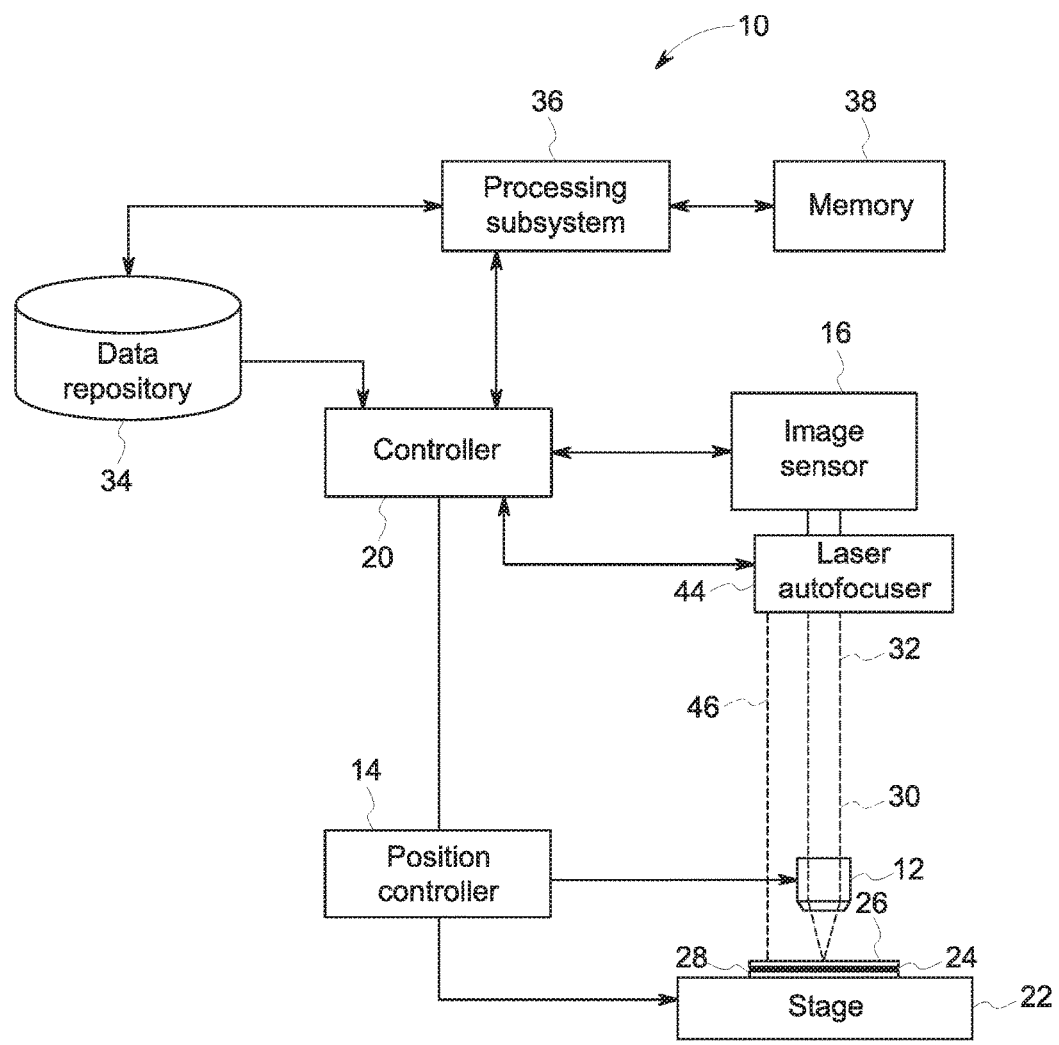
FIG. 1 is a block diagram of an imaging system, such as a digital optical microscope system, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As disused herein, the present approach measures the planar tilt of a slide on a microscope using an integrated laser auto-focuser. The tilt of the slide can be used to detect improperly loaded slides (i.e. if the slide is resting on either the cover-slip or a printed barcode), compensate for misalignment between the microscope optical axis and the slide, and reduce subsequent focusing times. By way of example, implementations of the present approach utilizes the laser autofocuser to determine the tilt of the slide through measurements at fixed locations (e.g., for points near the edge of the slide) and do not require any tissue to be present for focusing (as is needed for image-based autofocus techniques).

By way of example, in certain implementations after a slide 28 is loaded into the scanner, an integrated laser autofocus unit uses an emitted beam to detect the various glass/air interfaces formed by the combination of a slide, a sample, and/or a cover slip. The laser autofocuser then returns data showing reflected light intensity as a function of Z position (i.e., perpendicular relative to the X,Y imaging plane). In accordance with the present approach, this data pertaining to the glass/air interfaces is used to determine the Z position of the top and bottom of one or all of the slide, sample, or cover slip. By measuring the position of these glass/air interfaces at various positions in the X and Y axes along the slide, the planar tilt of the slide can be determined. This tilt can then be evaluated to see if the tilt is within acceptable limits, and provide a warning or indication to the user if it is not. In this manner, slide tilt may be determined based on data acquired by the laser autofocuser for various X,Y points on the slide, regardless of whether tissue is present or absent at those locations. For example, in one embodiment, if the tilt is within focusing range of the objective, the focusing algorithm would command the moving of objective to compensate for the tilt. However, if the tilt exceeds the focusing range, the algorithm would provide a notice or indication to the user and recommend the user reload the slide. On proceeding with a scan, the fitted tilt can be included or used in establishing an initial focus position. In certain embodiments, this process may be enhanced by fitting a second order polynomial surface instead of just a first order plane.

With the preceding discussion in mind, FIG. 1 illustrates an embodiment of an imaging system 10, such as a digital optical microscope, that may be used in accordance with aspects of the present disclosure. An example of one imaging system 10 is a GE Healthcare's IN Cell 2000 Analyzer, which is a modular lamp based cellular and subcellular imaging system for automated imaging in fixed and live cells. Such a system may utilize an automated image acquisition software package to work with In Cell Analyzer (or comparable imaging system 10) for automated tissue slide imaging in the field of high-value diagnostics.

The depicted imaging system 10 includes an objective lens 12, an image sensor 16, a controller 20, a laser autofocuser 44, and a scanning stage 22. In the depicted embodiment, a sample 24 is disposed between a cover slip 26 and a slide 28. The sample 24, the cover slip 26, and the slide 28 are positioned on the scanning stage 22. As discussed in greater detail herein, the present approach may be employed regardless of whether a sample 24 is or is not present on the slide 28 or may be employed on portions of the slide 28 and coverslip 26 where the sample 24 is or is not present. The cover slip 26 and the slide 28 may be made of a transparent material such as glass or plastic. In certain embodiments, the imaging system 10 may be part of an automated slide scanning system and may include an automatic slide feeder capable of feeding and loading slides for imaging one at a time from a magazine.

In certain embodiments, the sample 24 may be a biological sample, such as a tissue sample for analysis using pathology or histology techniques. In other instances, the sample 24 may be an industrial object, such as integrated circuit chips or microelectromechanical systems (MEMS). By way of example, such samples may have a thickness that averages from about 5 microns to about 7 microns and may vary by several microns. Examples of such samples may also have a lateral surface area of approximately 15 mm×15 mm.

In practice, the objective lens 12 is separated from the sample 24 along an optical axis in the Z (vertical) direction and has a focal plane in the X-Y plane coplanar with the slide 28. The objective lens 12 collects light 30 transmitted or reflected by the sample 24 at a particular field of view and directs the light 30 to an image sensor 16. As used herein, the term "light" encompasses any specified wavelength or range of wavelengths (i.e., spectrum) of interest for an imaging operation, whether visible to the human eye or otherwise. In one embodiment, the image sensor 16 generates one or more images of the sample 24 corresponding to a respective field of view at the time the image is acquired based on a primary light path 32. In certain embodiments, the image sensor 16 may be any suitable digital imaging device, such as a commercially available charge-coupled device (CCD) based image sensor.

The objective lens 12 employed in the system 10 may vary in magnification power based on considerations such as the application and the size of the sample features to be imaged. In one embodiment the objective lens 12 may be a high power objective lens providing a 20x or greater magnification and a having a numerical aperture of 0.5 or greater than 0.5 (small depth of focus). As will be appreciated, in other embodiments, the objective lens 12 may provide a different degree of magnification and/or may have a larger or smaller numerical aperture. By way of example, in one embodiment the objective lens 12 may be spaced from the sample 24 in the Z-direction by a distance ranging from about 200 microns to about a few millimeters and may collect light 30 from a field of view of 750μ×750μ in the focal plane. As will be appreciated, depending on the application, the working distance, the field of view, and the focal plane may vary depending upon the configuration of the system 10 and/or the characteristics of the sample 24 to be imaged. Further, as discussed herein, in embodiments where aspects of the imaging process are automated, such as to allow sequential acquisition of multiple images with respect to a sample 24, the system 10 may include a position controller 14, such as a piezo actuator, to provide fine motor control and rapid small field of view adjustment to the objective 12 and/or to adjust the position of the slide 28 or the scanning stage 22 on which the slide 28 is positioned.

Depending on the imaging protocol or application, the imaging system 10 may illuminate the sample 24 using one or more of a wide variety of imaging modes, including bright field, phase contrast, differential interference contrast and fluorescence. Thus, the light 30 may be transmitted or reflected from the sample 24 in bright field, phase contrast or differential interference contrast applications, or the light 30 may be emitted from the sample 24 (fluorescently labeled or intrinsic) fluorescence imaging applications. Further, the light 30 may be provided using trans-illumination (where a light source and the objective lens 12 are on opposite sides of the sample 24) or epi-illumination (where a light source and the objective lens 12 are on the same side of the sample 24). Therefore, as will be appreciated, the imaging system 10 may include a light source (such as a high intensity LED or a mercury or xenon arc or metal halide lamp) in certain embodiments.

As noted above, in one embodiment the imaging system 10 may be configured as a high-speed imaging system. Such a high-speed system may be configured to rapidly capture a large number of digital images of the sample 24, each image corresponding to a particular field of view of the sample 24. In certain applications, the particular field of view associated with an image may be representative of only a limited fraction of the entire sample 24. Further, the respective fields of view associated with a sequence of images may be adjacent to one another or may overlap one another. In an example of such an embodiment, the slide 28 is imaged repeatedly in adjacent or overlapping areas or is passed in a scanning sweep through the image acquisition area, i.e., field of view. In one such embodiment, an image is acquired, the stage 22 is advanced in the X and Y direction to a position in which an adjacent or overlapping area is moved into the field of view, and another image is acquired. As discussed in greater detail below, slide or sample tilt and/or focal plane corrections for different locations in the X and Y directions may be determined by the present approaches and employed during such an acquisition sequence.

Further, as discussed herein, a set of the digital images associated with a particular acquisition sequence (such as a series of images acquired while the sample 24 is stained with a given stain) may be digitally combined or stitched together to form a digital representation of the entire sample 24, i.e., a composite or mosaic image or canvas. In one embodiment, the imaging system 10 may store the plurality of acquired images, as well as any composite or mosaic images generated using the acquired images, in a data repository 34 and/or memory 38.

As depicted in the present embodiment, the imaging system 10 may also include an exemplary processing subsystem 36 that may facilitate the execution of an automated imaging protocol and/or the processing of image data acquired by the imaging system 10. For example, the processing subsystem 36 may be configured to synthesize a composite image based upon a series of acquired images and to perform a referencing or registration operation with respect to other images or composite images generated for the same sample 24, such as after the sample 24 has been stained with a different compound. The processing subsystem 36 may also communicate with a display device (i.e., a screen or monitor) to cause the display of the acquired images or a composite image generated using the acquired images. Although the memory 38 is shown as being separate from the processing subsystem 36 in the depicted example, in certain embodiments the processing subsystem 36 and memory 38 may be provided together, i.e., as a single or coextensive component. Additionally, although the present example depicts the processing subsystem 36 as being a separate component from the controller 20, in other embodiments, the processing subsystem 36 may be combined with the controller 20 or may function as the controller 20.

As noted above, the imaging system 10 in the depicted example also includes a laser autofocuser 44, which may be used during operation to facilitate image acquisition as well as to perform calibration operations. As part of its operation, the laser autofocuser 44 emits infrared (IR) light in the form of a coherent laser beam toward the slide 28 and collects back reflected signal to generate focus information. As the laser spot is scanned through a specimen (e.g., slide 28, sample, 24, and cover slip 26), the amount of back reflected light varies with the change of index of refraction seen by the laser spot at its focus position. Back reflected light is then collected via a photo-detector and recorded as a function of Z position.

Figure 2:
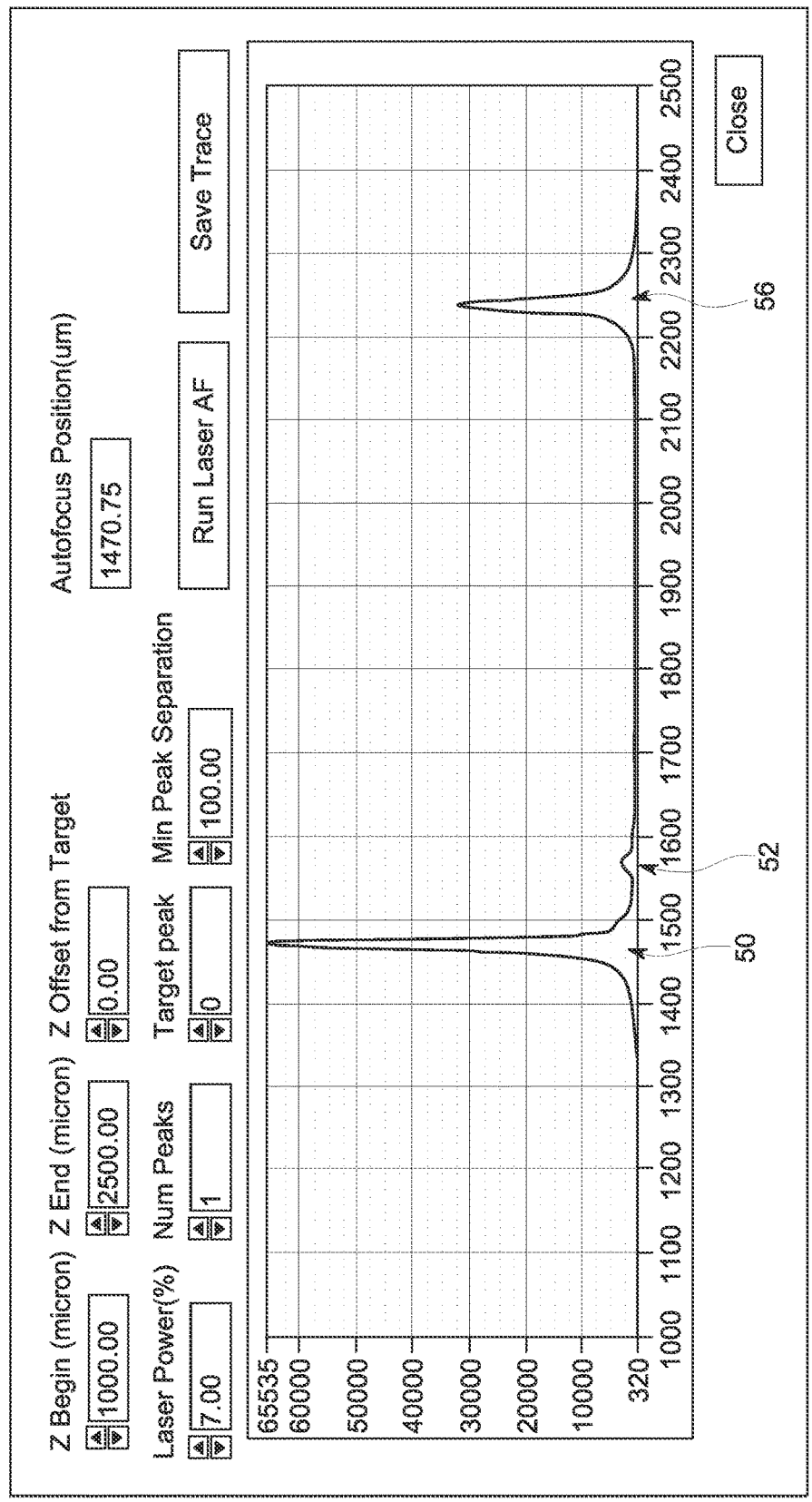
FIG. 2 is a graphical depiction of autofocus data for a slide, sample, and coverslip, in accordance with aspects of the present disclosure.

For the case of an inverted cover-slipped slide, this scan will typically yield several distinct peaks. By way of example, and turning to FIG. 2, there will typically be a strong peak 50 at the air/coverslip interface (at ~1,450μ in FIG. 2); a smaller peak 52 at the combined coverslip/mounting media interface and mounting media/slide interface (at ~1,580μ in FIG. 2); and, lastly, another large peak 56 at the slide/air interface (at ~2,250μ in FIG. 2) as the focused laser spot exits the slide 28.

Figure 3:
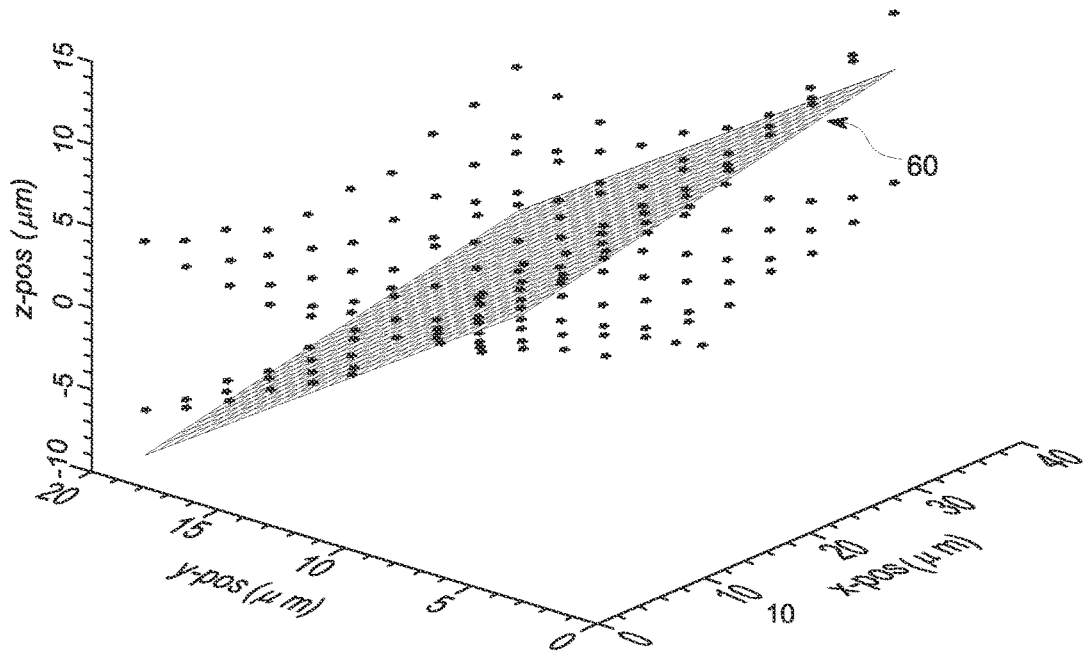
FIG. 3 depicts fitting of a plane to autofocus data, in accordance with aspects of the present disclosure.
Figure 4:
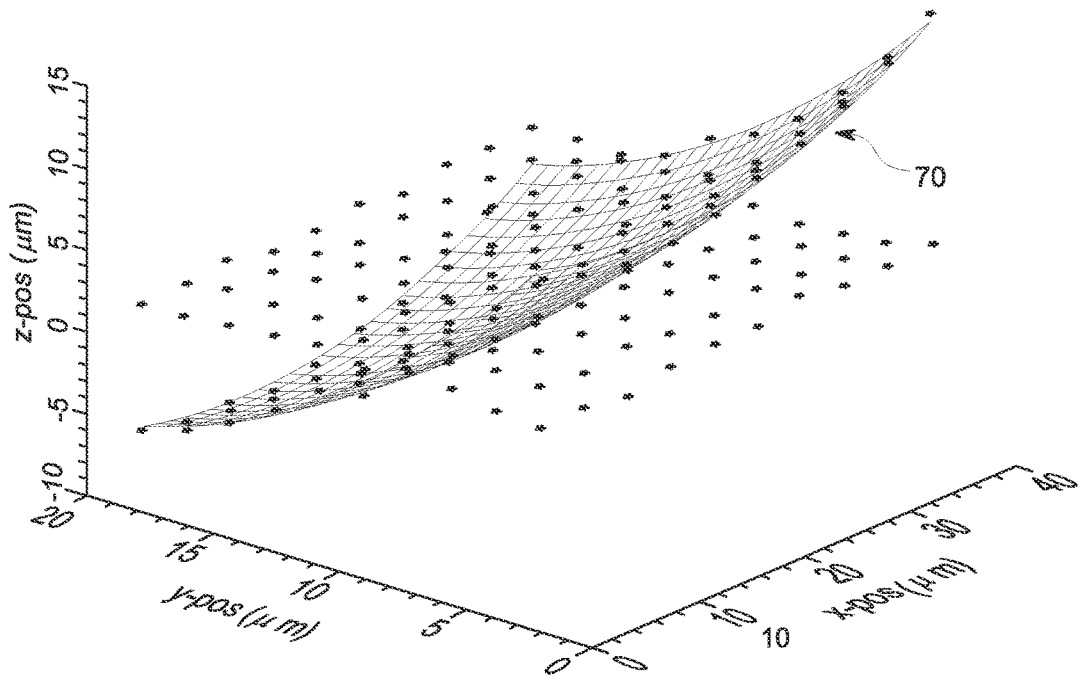
FIG. 4 depicts fitting of a second-order surface to autofocus data, in accordance with aspects of the present disclosure.

From this autofocus scan the Z position of both the top and the bottom of the slide 28 can be determined. By scanning multiple points (e.g., three or more) across the slide 28 the top and bottom of the slide 28 can be determined at each position. In one embodiment, either the top or the bottom slide data can be selected and the selected X, Y, and Z-position data can be fit to a plane 60, as shown in FIG. 3. In practice, it may be desirable to select the position data corresponding to the top of the slide 28 so that tilt of the cover slip 26 relative to the slide 28 is not a factor. Once a planar fit is obtained, the angle of rotation of the slide about both the X-axis and the Y-axis (theta_x ($\theta_x$) and theta_y ($\theta_y$)) can be extracted. The extracted angles can then be evaluated to determine if they are within an allowable range, such as by comparison to a specified or pre-established threshold. In one embodiment, the allowable range can be determined on a per-objective basis and/or can be found by dividing the depth of focus by the field of view size. In one implementation, if the tilt is within the focusing range of the respective objective, a focusing algorithm would command the moving of objective to compensate for the tilt. However, if the tilt exceeds the focusing range for the objective, the algorithm would provide an indication to the user and recommend the user reload the slide 28.

If the measured tilt is within an acceptable limit, the measured tilt can then be used (such as by controller 20 and/or position controller 14) to automatically servo the objective position as the slide 28 is scanned. That is, the measured tilt can be used during sequential imaging at different X,Y locations to maintain focus at the different respective X,Y locations. For example, if there is only a tilt around the Y-axis, as the user moves in the X-direction, the objective 12 can be automatically moved up in Z to compensate for this tilt. This behavior can be performed behind the scenes (i.e., automatically) so that, to the microscope operator there will be no apparent motion in Z. In this way the slide-based axes may be used to provide the underlying reference.

In certain embodiments, the utility provided by having the tilt information can be expanded upon by determining a good focus value for a single point on the plane 60. This may be accomplished using an imaged based focusing algorithm, such as a Brenner gradient. This initial focus point can then be used to link the previously obtained planar fit to this point. Then, as the user moves across the slide 28, focus may automatically be varied according to the measured planar tilt. If there are no deviations from linearity of the slide itself (i.e. it is perfectly planar) this will lead to focused images with no additional measurements. In practice, there are typically some deviations in the slides, but by following the planar tilt of the slide 28, image based auto-focusing will only need to be performed over a small range in the Z direction, as slide tilt will have already been compensated for. In practice, this greatly reduces scanning time and greatly simplifies focusing.

As will be appreciated, the fit of the X, Y, and Z-position data can instead be to a second order surface 70 (e.g., a curved surface), typically using five or more points to provide an estimation of error (though typically less than ten or fifteen points). This will allow curvature present in a glass slide to be fit and will enable even better baseline focus. As will be appreciated, a second-order surface 70 obtained by such a fitting operation may be used in place of fitted plane 60 in the determination of whether slide tilt and/or curvature is outside of acceptable tolerances and/or in imaging operations that automatically account for slide tilt and/or curvature, as described herein.

In certain implementations, the focus data described above may be further leveraged. In the case of imaging over multiple rounds, the fact that any details of the slide will likely not change (i.e. if the slide has any curvature to it this will be fixed over all rounds and any undulations in focus due to variation of tissue height should remain fixed as well) may be used. Instead, assuming at most a planar shift in positions from the first to the nth round (i.e. the slide will not sit exactly level in the holder in the same way between subsequent rounds), the laser autofocuser 44 can be used to measure the tilt, and with the planar tilt known, the best focus values from the previous round can be utilized to predict the best focus for the current round. That is, by measuring this tilt with the laser autofocuser 44 any changes in how the slide 28 sits in the holder 22 can be compensated for. Once this is compensated for, the measured focus positions from a previous round can be used as the current focus positions, thus eliminating the need for further autofocusing and increasing speed of image acquisition. That is, factoring in measured slide tilt into the focusing algorithm provides a narrower the search region in Z that must be traversed to find a good focus. However, even without the laser autofocuser 44, focus positions specified on the previous round can be returned to and refocused. Once refocused, a planar shift and transform can be computed from the previous focus positions to account for the subsequent planar shift.

For example, in one embodiment a planar surface 60 (or second order surface 70) may initially be fit to the slide 28 using autofocuser information as discussed herein. Once planar fit is accounted for, it can be assumed that the slide plane is the same as it was in the previous round. In order to tie the new focus positions to the previously determined focus positions, it is only necessary to return to at least one point in common with the prior round (e.g., the first round). When this is done, any shift in Z that may have occurred between the two rounds that is not accounted for in the planar fit may be accounted for. In practice, this should be close, but the resolution of the laser may not be as high as that of autofocus. Once this offset is determined, images may be acquired utilizing the previous focus points and the inter-round offset.

Alternatively, image-based focus values may be employed on a number of points (e.g., 3 or more) to determine the slide tilt instead of the utilizing the laser scanner. Current focus points may then be linked or otherwise associated with the focus points determined on the previous round and images may then be acquired at the previously determined focus points.

With the preceding discussion in mind, studies were performed to evaluate the effectiveness of the present approaches. In one such study, normal breast tissue slides from Clarient were used (slide barcode numbers are: S12040053, S12040054, S12040055, S12040056). Tape of ~100 µm thickness was applied to corners of tissue slides to create the tilting effect. An IN Cell 2000 Analyzer from GE was used for fluorescence imaging of different biomarkers with dapi, cy3, and cy5 staining. Automated image acquisition was performed using a suitable software platform and in accordance with the present approaches. A 10× objective was used in the study.

With respect to the testing plan, three representative tilt scenarios (FIG. 5) were tested to evaluate the performance of present approach. One slide without tape was used as control. Two layers of tape (~200 um thick) were used on the bottom corners of the slide 28 to simulate tilt scenarios of one corner (FIG. 3, upper left), two left corners (FIG. 3, middle), and two bottom corners (FIG. 3, lower ride) of the slide 28. Two sets of data were collected as noted above, one for using tilt correction as described herein, and one not employing tilt correction. Theoretical values of tilt angles were calculated from the data where tilt correction was not employed. The theoretical values were then compared to the measured value from the data using tilt correction to evaluate the correspondence.

In particular, with respect to the testing methodology, for the tilted slides of FIG. 3, two sets of experiments were run in parallel. Twelve spread-out 1-mm circular areas were picked on each slide for imaging. Imaging was performed first without accounting for tilt. Coordinates were recorded (x1, y1, z1) for each area by manual focusing, where (x1,y1) is the coordinate of the area on the slide and z1 is the focal plane coordinate. Subsequently, imaging was performed accounting for tilt, as discussed herein and using automated image acquisition. Coordinates were recorded (x2, y2, z2) for the twelve areas again automatically. Coordinates were extracted from the data and angles to correct slide tilting in reference to Y axis and X axis were extracted from $\theta_x$ and $\theta_y$ as recorded in the data. Manual focusing coordinates (x1, y1, z1) for the twelve points were fitted to a plane to calculate the theoretical values of $\theta_x$ and $\theta_y$ for correct tilt correction. Theoretical values of $\theta_x$ and $\theta_y$ (from x1, y1, z1 plane fitting) were then compared to measured $\theta_x$ and $\theta_y$ (from x2, y2, z2) to see if they matched each other within noise levels.

Figure 6:
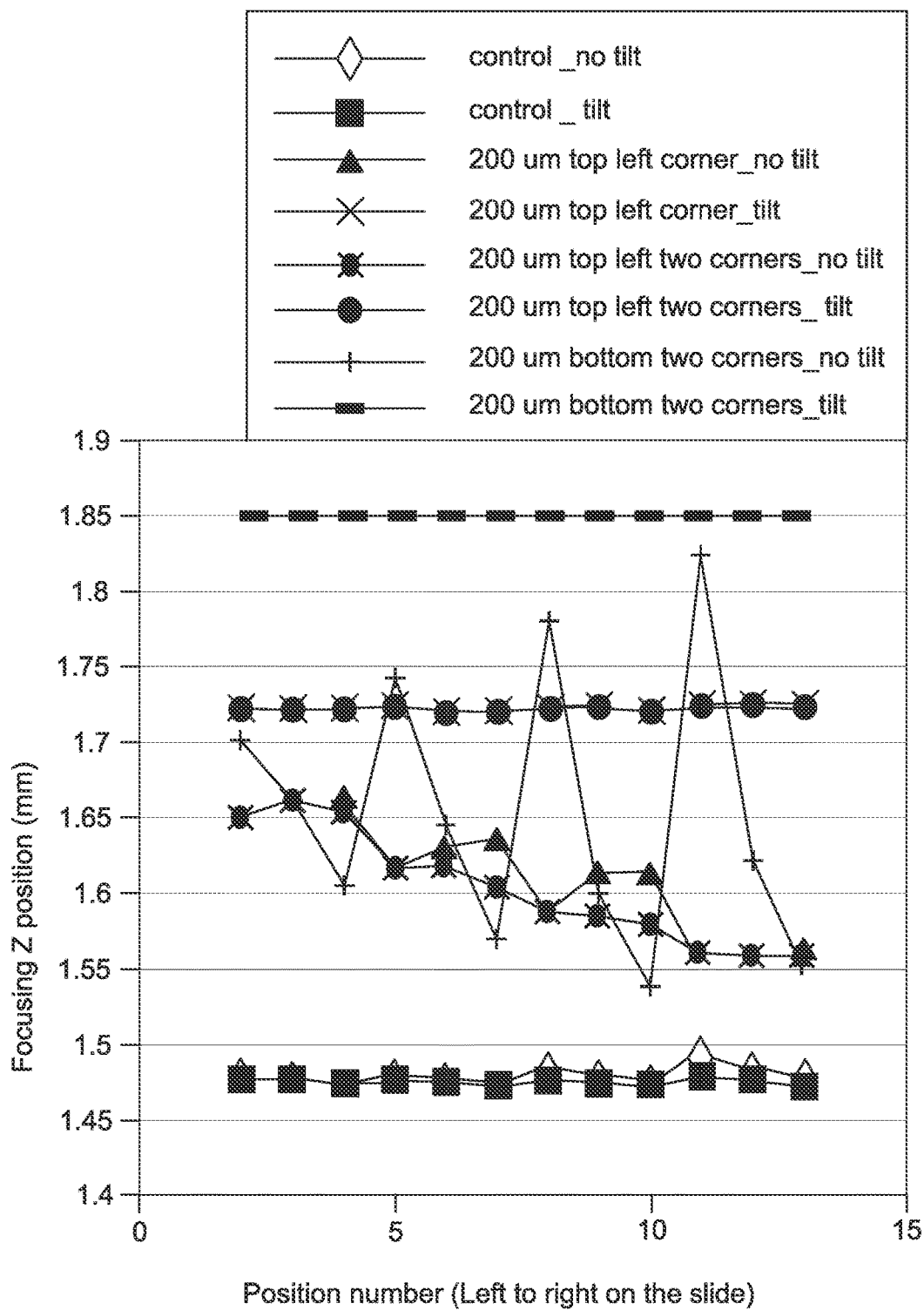
FIG. 6 depicts results of a focus position comparison between tilt-corrected and uncorrected data, in accordance with aspects of the present disclosure.
Figure 7:
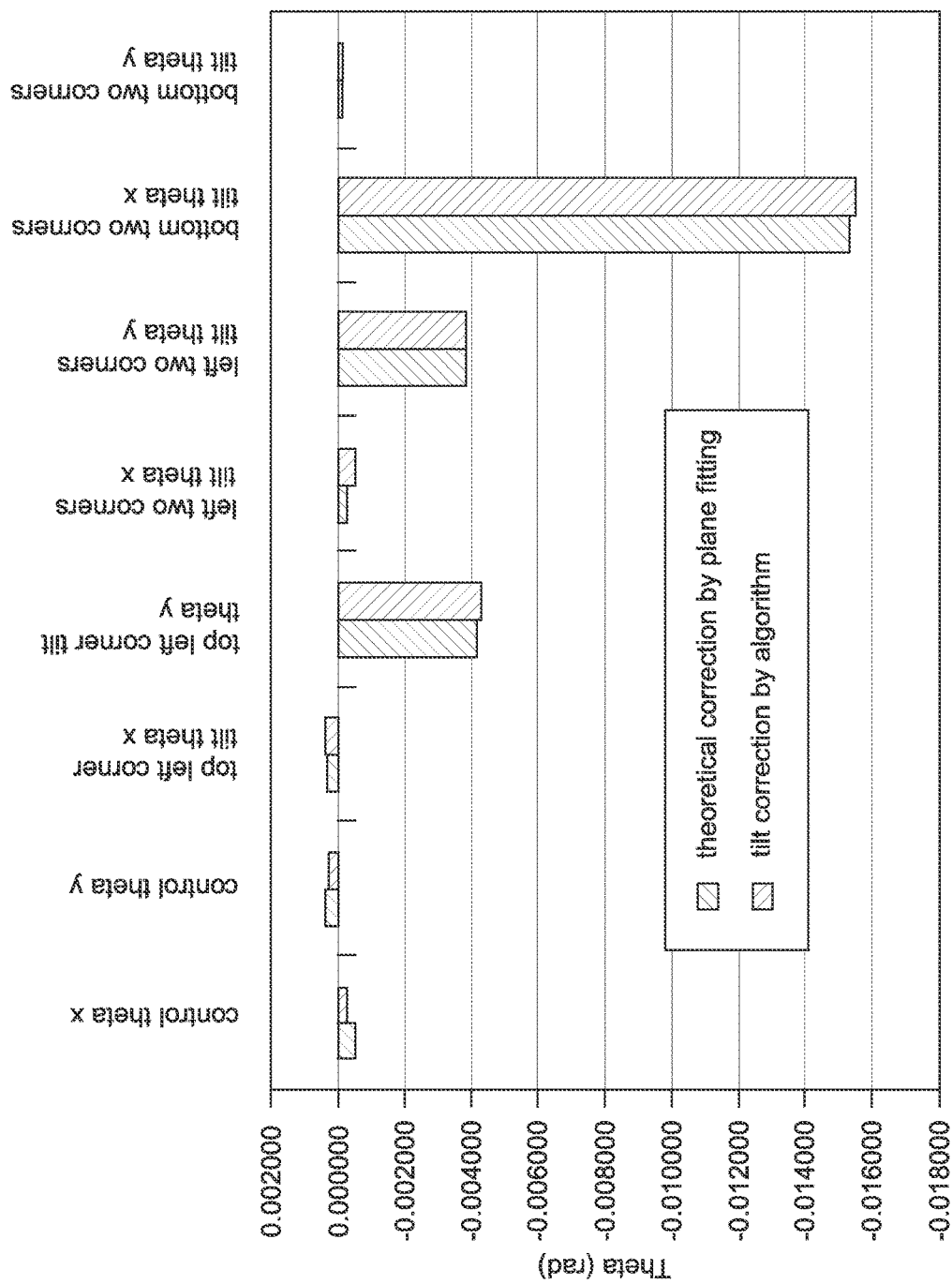
FIG. 7 depicts a comparison between theoretical and algorithmically tilt corrected data, in accordance with aspects of the present disclosure.
Figure 8:
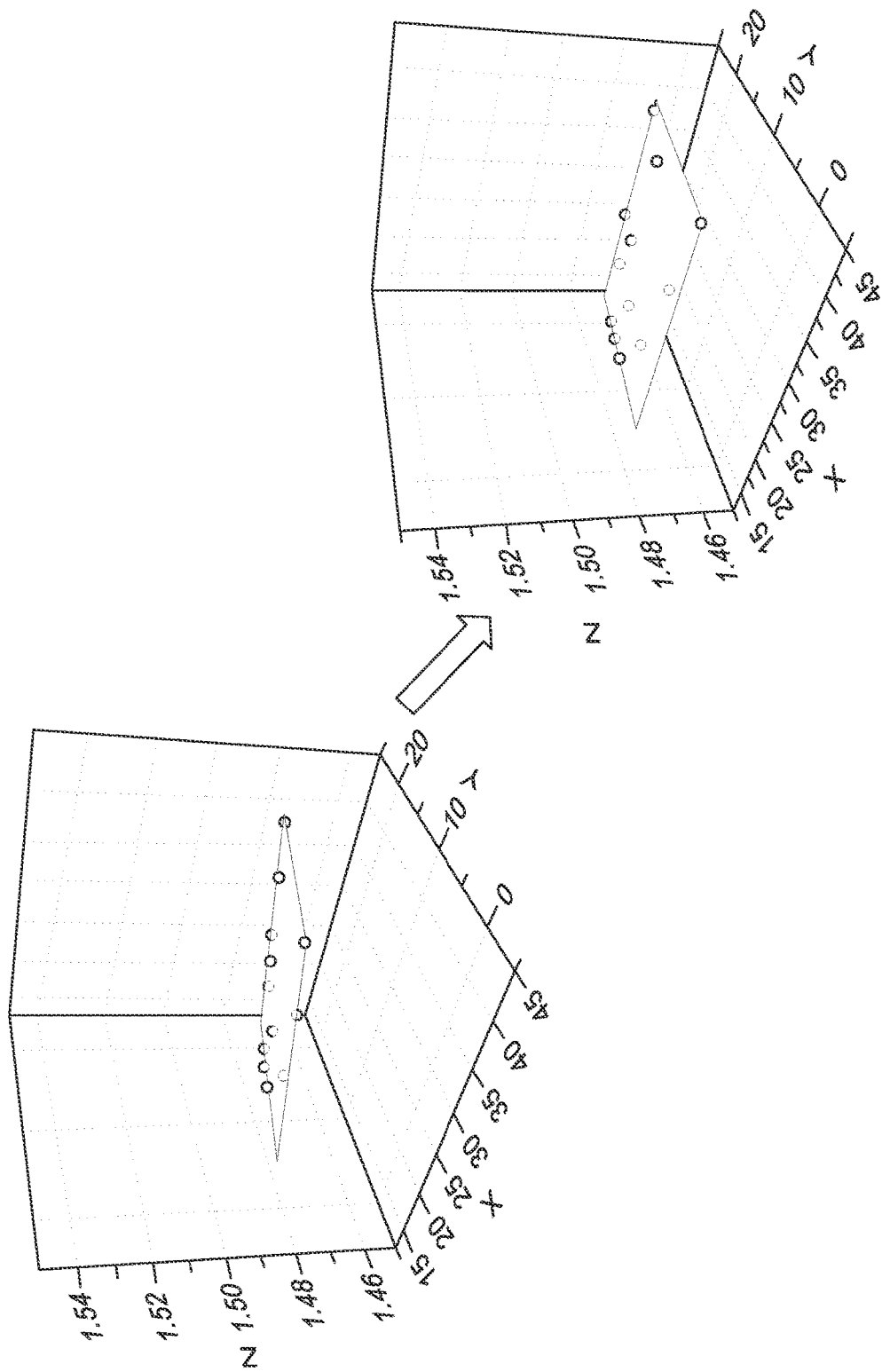
FIG. 8 graphically depicts control slide data before and after tilt correction, in accordance with aspects of the present disclosure.
Figure 9:
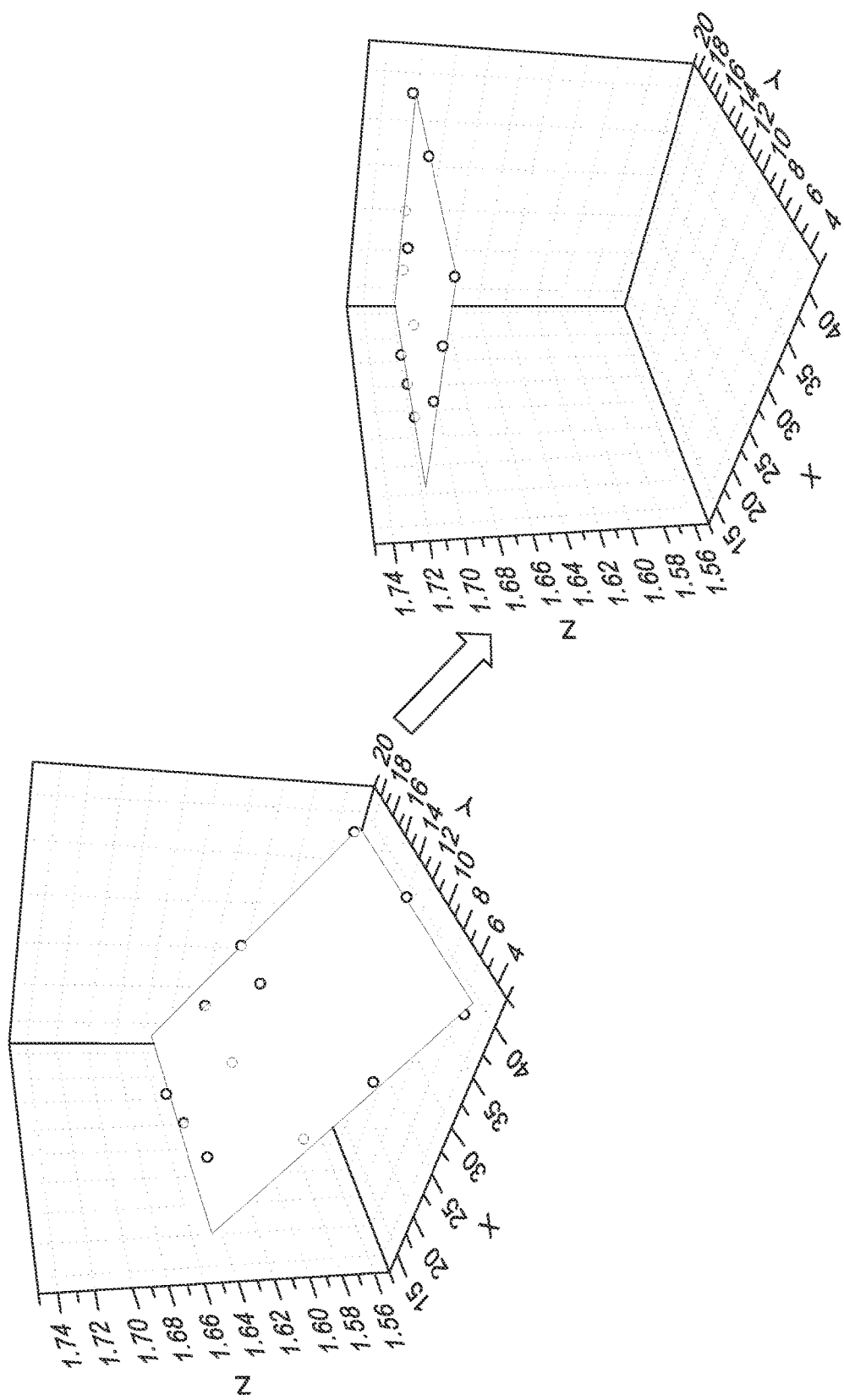
FIG. 9 graphically depicts a first scenario of experimental slide data before and after tilt correction, in accordance with aspects of the present disclosure.
Figure 10:
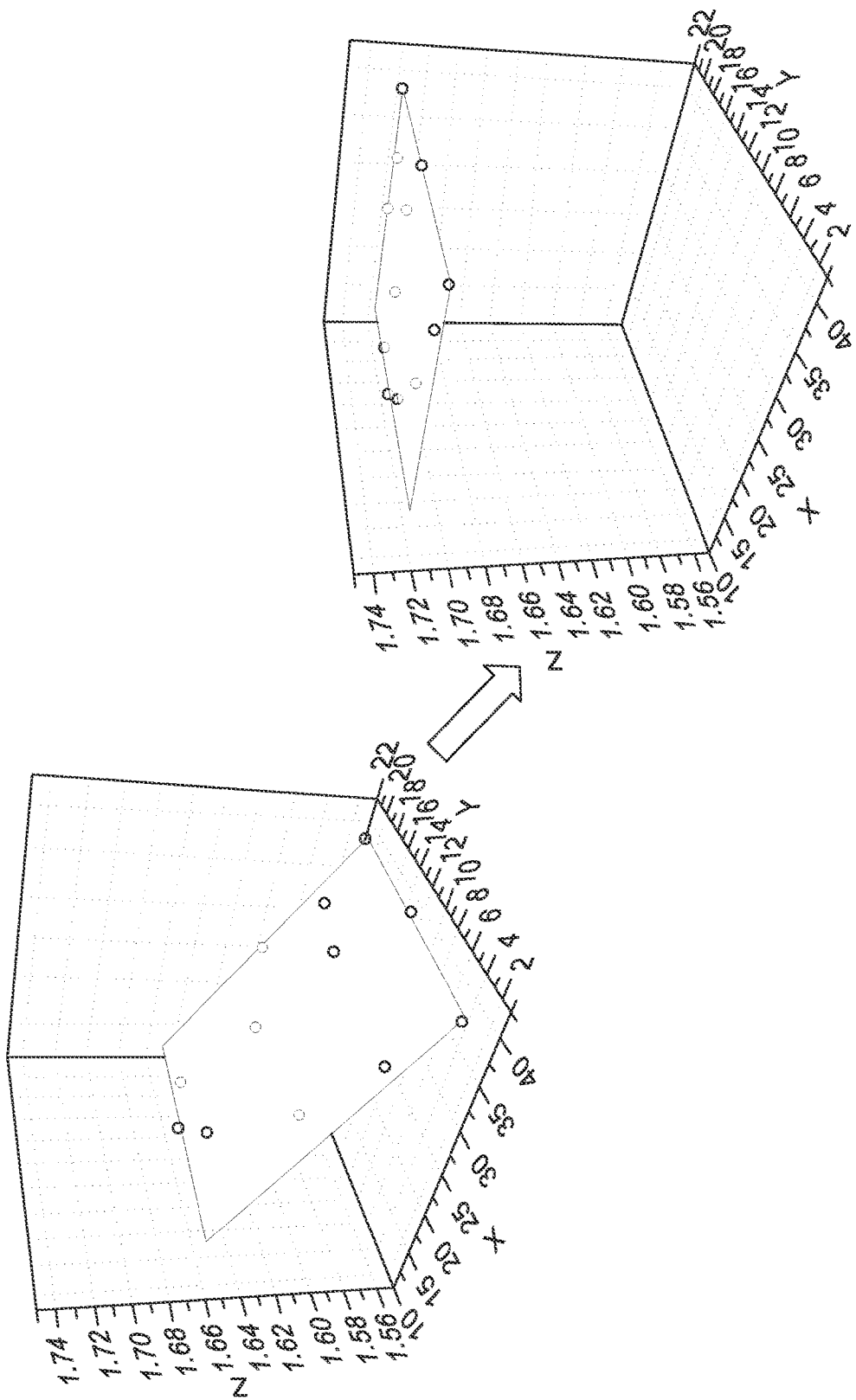
FIG. 10 graphically depicts a second scenario of experimental slide data before and after tilt correction, in accordance with aspects of the present disclosure.

As shown in FIG. 6, when slides were tilted, the focal plane for individual circular areas varied. After using tilt correction as disclosed herein, the objective compensated for the tilt and reported the same focal plane for all twelve areas. In contrast, where tilt correction was not employed, there was significant deviation in focal plane across the twelve areas. Turning to FIG. 7, the theoretical tilt correction angles $\theta_x$ and $\theta_y$ were observed to be very close to measured value.

Figure 5:
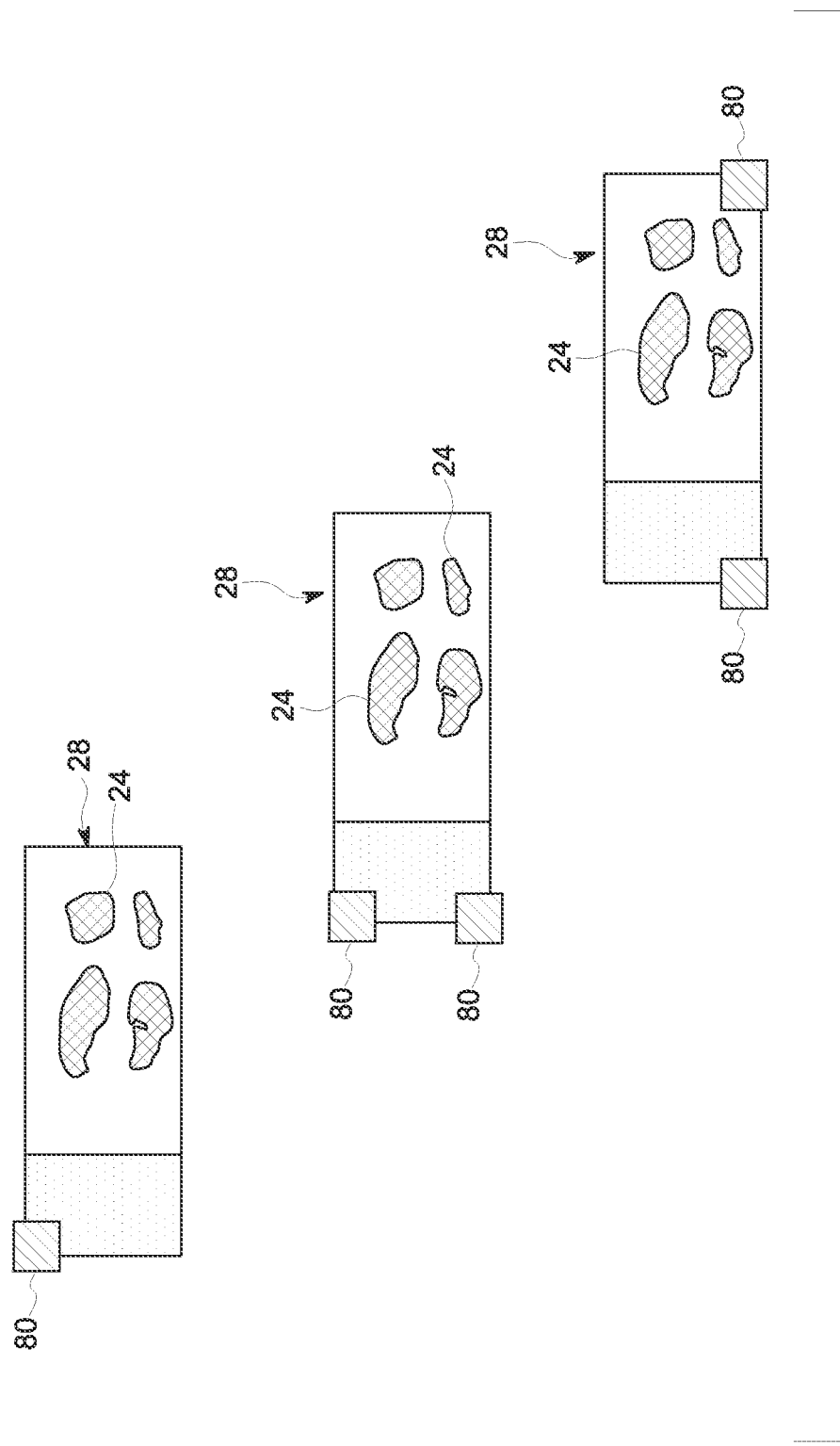
FIG. 5 depicts three different slide tilt configurations for evaluation of a tilt correction algorithm, in accordance with aspects of the present disclosure.
Figure 11:
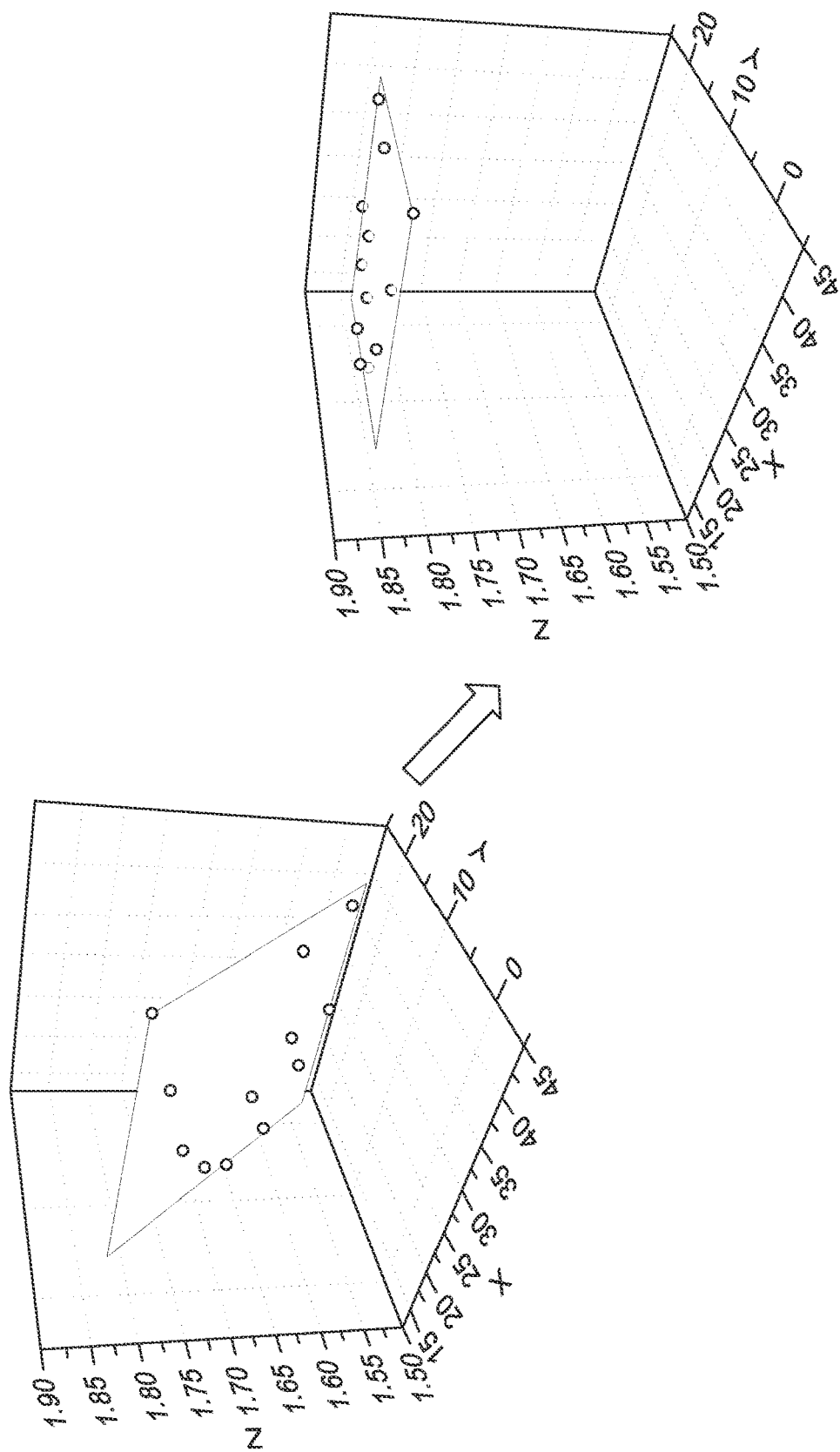
FIG. 11 graphically depicts a third scenario of experimental slide data before and after tilt correction, in accordance with aspects of the present disclosure.

Turning to FIGS. 8-11, a graphical depiction of a before-and-after plane fitting is shown for a control scenario (FIG. 8), for the upper left scenario of FIG. 5 (FIG. 9), for the middle scenario of FIG. 5 (FIG. 10), and for the lower right scenario of FIG. 5 (FIG. 11). By plotting out the fitted plane for both before-and-after using tilt correction for these three tilt scenarios and one control, it can be seen that tilt correction has provided a useful degree of correction.

Figure 12:
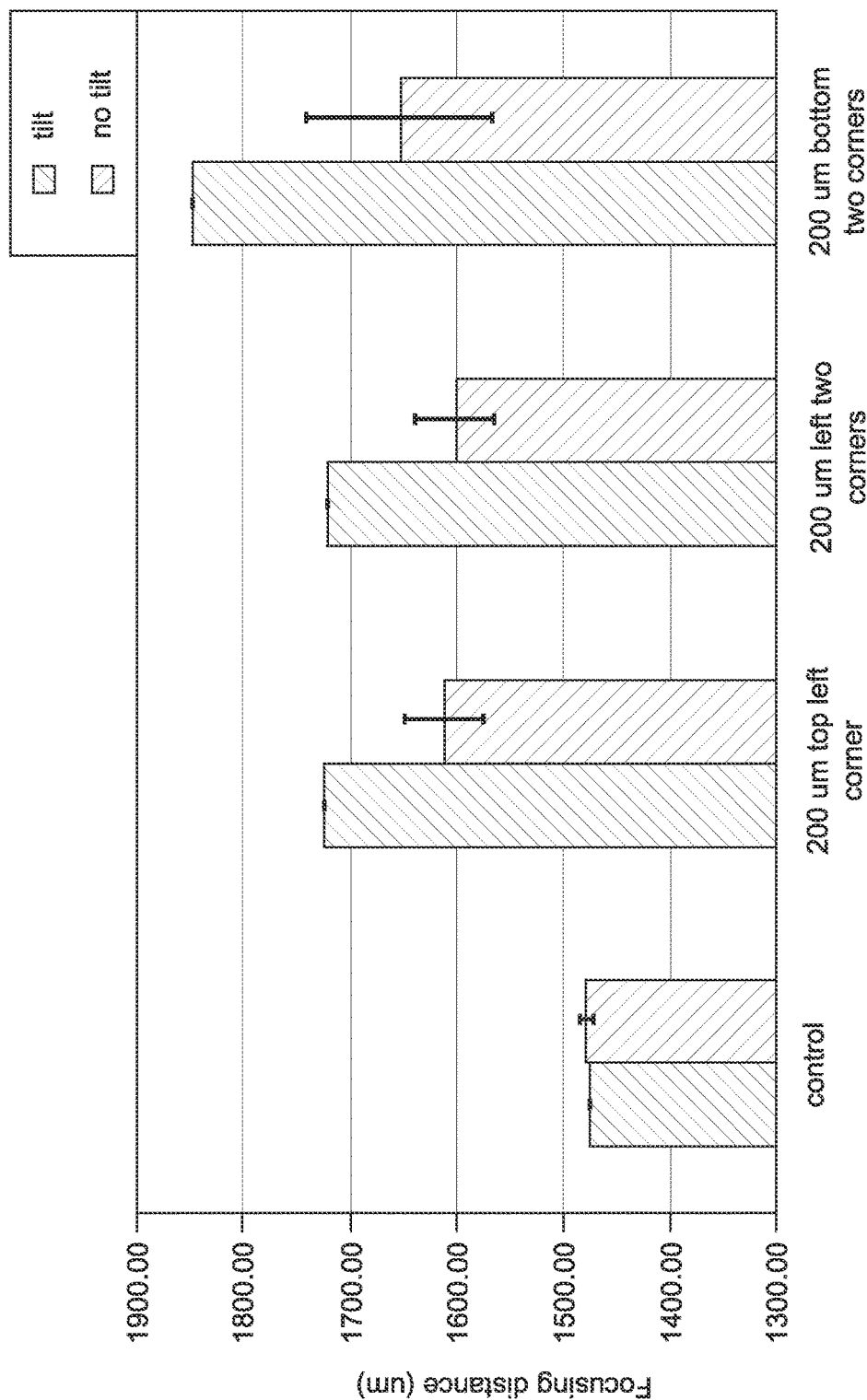
FIG. 12 graphically depicts study data showing Z-focus before and after tilt correction.

Looking at the average Z focus before and after tilt correction, the standard deviation of Z focus after using tilt correction was observed to improve, from 41.10±34.13 um to 0.88±1.01, as shown in Table 1 (below) and FIG. 12.

TABLE 1

Z focus before and after tilt correction

| Z focus (μm) | Control (no tilt correction) | 200 μm Top Left Corner (no tilt correction) | 200 μm Left Corners (no tilt correction) | 200 μm Bottom Corners (no tilt correction) | Avg. | Std. Dev. |
|---|---|---|---|---|---|---|
| Avg. | 1480.50 | 1612.70 | 1602.76 | 1653.46 | 41.10 | 34.13 |
| Std. Dev. | 5.10 | 36.32 | 35.57 | 87.41 | | |

| | Control (tilt correction) | 200 μm Top Left Corner (tilt correction) | 200 μm Left Corners (tilt correction) | 200 μm Bottom Corners (tilt correction) | Avg. | Std. Dev. |
|---|---|---|---|---|---|---|
| Avg. | 1475.56 | 1723.95 | 1722.80 | 1849.81 | 0.88 | 1.01 |
| Std. Dev. | 1.74 | 1.77 | 0.01 | 0.01 | | |

Technical effects of the invention include ensuring that slides are placed properly on the slide holder and are not too tilted to allow proper focus. Technical effects also include optimizing the use of autofocusing by accounting for an overall planar tilt of a slide in initial focus position values. Additionally, by utilizing a planar fit, subsequent imaging rounds can take advantage of a prior imaging round to leverage focus and slide tilt data. A consequent technical effect is the elimination or reduction of autofocusing on subsequent imaging rounds and reduced imaging times. Tilt correction as discussed herein also reduces the incidence of out-of-focus images, even when a slide is tilted. Furthermore, by determining if a slide is properly loaded at the start of a scan, the workflow time penalty incurred by scanning a slide that is too tilted to produce good images can be reduced or eliminated. Utilizing previous rounds focusing information, the amount of time required for imaging can be greatly reduced by reducing or eliminating nearly all refocusing time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A digital microscopy imaging system, comprising:
a stage configured to hold a slide;
an objective and image sensor configured to acquire images of a portion of the slide, when present;
a position controller configured to move one or both of the objective and the stage relative to one another in accordance with an imaging protocol;
a controller configured to control operation of one or both of the position controller and the image sensor;
a laser autofocuser configured to emit a ranging beam toward the stage;
a memory storing one or more routines; and
a processing component configured to execute the one or more routines stored in the memory, wherein the one or more routines, when executed by the processing component, cause acts to be performed comprising:
acquiring a plurality of autofocus measurements using the laser autofocuser, wherein autofocus measurements are acquired at different fixed locations relative to the slide, when present, by scanning the laser autofocuser through transition interfaces at each of the different fixed locations, and wherein the fixed locations are independent of the presence or absence of a tissue sample at the fixed locations;
determining at least one of a slide top or a slide bottom at each of the different fixed locations based on the autofocus measurements;
fitting a surface to the plurality of autofocus measurements; and
based on the fit of the surface to the plurality of autofocus measurements, deriving a measure of the tilt of the slide relative to the slide holder.

2. The digital microscopy imaging system of claim 1, wherein the one or more routines, when executed by the processing component, cause additional acts to be performed: comprising:
automatically generating one or more focus points for the objective based on the surface;
moving the objective based on the generated focus points;
acquiring images of the slide.

3. The digital microscopy imaging system of claim 2, wherein the one or more routines, when executed by the processing component, cause additional acts to be performed: comprising:
upon removal and replacement of the slide on the stage, computing a shift and transform from a set of previous focus positions to account for a current shift; and
acquiring a second set of images based on the transformed set of focus positions.

4. The digital microscopy imaging system of claim 2, wherein the one or more routines, when executed by the processing component, cause additional acts to be performed: comprising:
   comparing the measure of the tilt of the slide to a comparison criterion; and
   providing a notification if the tilt of the slide exceeds the comparison criterion.

5. The digital microscopy imaging system of claim 1, wherein the surface comprises a plane or a second order surface.

6. The digital microscopy imaging system of claim 1, wherein the plurality of autofocus measurements comprises five or more autofocus measurements and wherein the surface comprises a second-order surface.

7. The digital microscopy imaging system of claim 1, wherein the one or more routines, when executed by the processing component, cause further acts to be performed comprising:
   comparing the measure of the tilt of the slide to a comparison criterion; and
   providing a notification if the tilt of the slide exceeds the comparison criterion.

8. The digital microscopy imaging system of claim 7, wherein comparing the measure of the tilt of the slide to the comparison criterion comprises determining if the measure of the tilt is within a focusing range of an objective lens.

9. The digital microscopy imaging system of claim 7, wherein the comparison criterion is determined by dividing a depth of focus by a field of view size for a given objective lens.

* * * * *